United States Patent [19]
Blasko et al.

[11] Patent Number: 5,905,644
[45] Date of Patent: May 18, 1999

[54] DC BUS VOLTAGE CONTROLLER

[75] Inventors: Vladimir Blasko, Grafton; Vikram Kaura, Thiensville, both of Wis.

[73] Assignee: Allen-Bradley Company, LLC, Milwaukee, Wis.

[21] Appl. No.: 09/127,585

[22] Filed: Jul. 31, 1998

[51] Int. Cl.$^6$ .............................. H02M 1/12; H02P 5/34
[52] U.S. Cl. ............................................. 363/41; 318/801
[58] Field of Search .................................. 363/40, 41, 97, 363/98, 131, 132; 318/800, 801, 805, 808, 809

[56] References Cited

U.S. PATENT DOCUMENTS

| | | | |
|---|---|---|---|
| 5,585,708 | 12/1996 | Richardson et al. | 318/800 |
| 5,610,806 | 3/1997 | Blasko et al. | 363/41 |
| 5,644,205 | 7/1997 | Nguyen Phuoc et al. | 318/801 |
| 5,706,186 | 1/1998 | Blasko | 363/41 |
| 5,736,825 | 4/1998 | Kaura et al. | 318/599 |
| 5,739,664 | 4/1998 | Deng | 318/808 |
| 5,821,727 | 10/1998 | Yura | 318/809 |

*Primary Examiner*—Matthew Nguyen
*Attorney, Agent, or Firm*—Michael A. Jaskolski; John J. Horn; John M. Miller

[57] ABSTRACT

An apparatus for use with a switch-mode rectifier for minimizing DC bus voltage without causing current distortion, the apparatus monitoring rectifier saturation and decreasing DC bus voltage until the rectifier is near a saturation point and then maintaining the DC bus voltage at that point.

17 Claims, 6 Drawing Sheets

DC BUS VOLTAGE CONTROLLER

BACKGROUND OF THE INVENTION

The present invention relates to power converters and more particularly to a control system for use with a voltage rectifier for minimizing voltage on a DC bus without distorting utility grid AC voltages and currents.

To illustrate the effects of distorting currents on a utility power grid, consider FIG. 11 wherein a utility source 10 is shown connected at a point of common coupling (PCC) (i.e., a utility-customer connection point) to a load 12 (e.g., a first utility customer) and other loads (e.g., other utility customers) represented collectively by numeral 14. The utility source 10 includes a finite internal impedance $L_s$. Due to the internal impedance $L_s$, when load 12 draws a non-sinusoidal current from the source 10, the waveform at the PCC becomes distorted with harmonic currents which can cause machinery and equipment connected at the other loads 14 to malfunction.

In addition to voltage waveform distortion at the PCC, other problems related to harmonic currents include additional heating and possibly over voltages in utility distribution and transmission equipment, errors in metering and malfunctioning of utility relays, interference with communication and control signals and equipment damage from voltage spikes created by high frequency resonances.

Unfortunately, harmonic or non-linear loads comprise an ever increasing portion of the total load for a typical industrial plant. In fact, by 1992, harmonic loads had become such a pervasive problem that the Institute of Electrical and Electronic Engineers (IEEE) recommended stringent harmonics standards, including strict utilities limitations, in a document referred to in the industry as IEEE Standard 519 which has generally been accepted in North America. Standard 519 was written with the general understanding that harmonics should be within a reasonable limit at the PCC and therefore puts limits on individual and total (i.e., distortion from all loads connected at a PCC) harmonic distortion.

One potential source of utility grid distortion includes power electronics required to modify utility voltages for driving motors. Generally, power electronic systems for receiving and converting utility voltages into AC voltages suitable for driving an AC motor include two converter stages, the first converter stage being a rectifier stage and the second converter stage being an inverter stage. The rectifier stage receives and converts the AC utility voltages to DC voltage and provides the DC voltage across positive and negative DC buses. The inverter stage receives and converts the DC voltage to AC voltages, usually at a different frequency and amplitude than the utility voltages, and provides the converted AC voltages to motor terminals to drive a motor.

To convert the AC utility voltage to DC voltage, a common rectifier configuration includes at least six diodes arranged to form three parallel rectifier legs between the positive and negative DC buses, each leg including a pair of series connected diodes. Each utility AC input line is connected to one of the legs between an associated diode pair. A charging bus capacitor is linked between the positive and negative DC buses. The diodes cooperate to pass each positive half cycle of AC voltage to the DC bus and to invert and pass each negative half cycle of AC voltage to the DC bus. The result is that an essentially DC current is provided on the DC bus and the bus capacitor charges to a DC voltage $V_{dc}$.

To convert the DC voltage $V_{dc}$ to AC voltage and control both frequency and amplitude, the inverter stage typically includes at least six switching devices (e.g. IGBT, BJT, etc.) arranged to form parallel legs between the positive and negative DC buses, each leg including a pair of series connected devices. A node between each pair of inverter switches is linked to a separate one of the motor stator windings at a motor terminal.

The inverter devices in each leg are alternately turned on and off such that a series of high frequency voltage pulses are provided at an associated terminal. The devices are turned on and off such that the fundamental value of the resulting high frequency pulses is a low frequency alternating voltage at the terminal. To generate device trigger signals for turning the devices on and off three modulating signals, a separate modulating signal corresponding to each of the inverter legs, are provided for comparison to a high frequency triangle carrier signal. When a modulating signal is greater than the carrier signal, a trigger signal causes an associated lower device to turn off and an associated upper device to turn on thereby connecting an associated supply line to the positive DC bus. When a modulating signal is less than the carrier signal, the trigger signal causes an associated upper device to turn off and an associated lower device to turn on thereby connecting an associated supply line to the negative DC bus.

A modulation index Mi is the ratio of the peak value of a modulating signal and a peak value of the triangle carrier signal. Typically the low frequency alternating voltage changes linearly with the modulating signal up to a value of one for $M_i$. As index Mi is increased above one, while the alternating voltage will still increase, it increases at a fraction of the index $M_i$ rate. Therefore, where index Mi is between zero and one, the inverter is said to be operating in a linear region of operation.

The low frequency alternating voltages at the terminals cooperate to drive the motor as is well known in the art. When an inverter is used to drive a motor the inverter is said to be operating in a motoring mode.

In addition to driving the motor in a motoring mode, an inverter can also be used in a "braking" mode to reduce motor speed. During braking, the terminal voltages are provided at a speed which is less than a motor rotor's mechanical speed. In this case, instead of providing current to the motor stator windings, the motor operates as a generator providing current back through the inverter to the DC bus. In essence, the inverter acts as a rectifier during braking tending, like the rectifier connected to the utility grid, to charge the bus capacitor.

With a diode bridge the current direction from the grid to the bus capacitor cannot be reversed. Therefore, some mechanism must be provided to dissipate energy returned to the DC bus during braking, otherwise the voltage across the bus capacitor can reach destructive levels. One common way to dissipate braking current is to provide a switch in series with a braking resistor in parallel with the bus capacitor. If capacitor charge exceeds a threshold voltage level, the switch is closed so that the braking resistor dissipates braking energy.

As well known in the art, during steady state motoring at light load the DC voltage $V_{dc}$ using a diode bridge rectifier is approximately $\sqrt{2}$ times the line-to-line utility voltage VII. For example, if the line-to-line utility voltage VII is 460 volts, voltage Vdc is approximately 650 volts. If VII increases to 504 volts (i.e. a 10% increase), Vdc increases to 715 volts. During braking the DC voltage Vdc reaches the threshold voltage at which a resistor brake is turned on. In many rectifier configurations, the threshold voltage at which the resistor is switched in parallel with the charging capacitor to discharge braking energy is approximately 750 volts. Thus, with a diode bridge rectifier, the DC bus voltage often fluctuates during operation (e.g. between 650 and 750 volts).

While diode bridge rectifiers are relatively simple, inexpensive, easy to operate and do not cause appreciable utility grid distortion, they have at least two important shortcomings. First, because DC voltage Vdc changes as a function of line-to-line utility voltage VII, operating characteristics of other equipment linked to the utility can be disadvantageously affected by utility voltage fluctuations. For example, if voltage VII is initially at 480 volts so that the DC voltage Vdc is 678 volts, the motor terminal high frequency voltage pulses alternate between +339 and −339 volts and a first maximum speed is achievable. However, if voltage VII is reduced from 480 volts to 460 volts such that the DC voltage Vdc is reduced from 678 volts to 650 volts, the high frequency voltage pulses at the motor terminals fluctuate between +325 and −325 volts and a second maximum speed which is less than the first maximum speed is achievable.

Second, because a braking resistor is used to dissipate braking current, diode bridge rectifiers waste energy and are relatively inefficient. This is particularly true in applications where braking is performed frequently.

One way to overcome the shortcomings associated with a diode bridge rectifier has been to construct a controllable regenerative rectifier, also referred to herein and within the industry as a switch-mode rectifier. Like a typical inverter, a regenerative rectifier includes at least six switching devices arranged to form three parallel legs between the positive and negative DC buses, each leg including two series connected switching devices. Six separate diodes are arranged in inverse parallel relationship with the switching devices, a separate diode connected to each switching device. A DC bus capacitor is positioned between the positive and negative DC buses. A separate one of the three utility AC lines is connected to a node between an associated pair of series devices via an input reactor or inductor. For simplicity, utility line voltages will be referred to hereinafter as utility AC voltages and rectifier input voltages will be referred to as rectifier AC voltages.

In operation, initially the switching devices are turned off and the inverse parallel diodes operate as a diode bridge rectifier to charge the DC bus capacitor during an initial charging period. After the initial charging period and during a motoring operation, the switching devices are controlled like an inverter to generate rectifier AC voltages on the rectifier inputs which lag the utility AC voltages and have a slightly smaller amplitude. Where the rectifier AC voltages are in phase with and slightly less than the utility AC voltages, currents pass through the input reactors from the AC to the DC sides of the rectifier thereby providing currents to charge the bus capacitor and drive the motor.

To generate the rectifier AC voltages the rectifier is controlled in a manner similar to control of the inverter. To this end, rectifier devices in each leg are alternately turned on and off such that a series of high frequency voltage pulses are generated at an associated rectifier input. The fundamental value of the resulting high frequency voltage pulses is a low frequency alternating voltage at the rectifier input. By controlling the high frequency pulses, the desired low frequency fundamental alternating voltage can be generated.

In addition to being used during motoring, regenerative switch mode rectifiers can be used during braking to return energy recovered from motor inertia to the utility grid, hence the term "regenerative". During regeneration, as during motoring, rectifier switches are turned on and off to generate high frequency voltage pulses on the utility lines, the fundamental values of which result in low frequency alternating voltages on the utility lines which are preferably in phase with the rectifier AC voltages. However, instead of having amplitudes which are slightly less than the amplitudes of the utility AC voltages and phases which lag the utility AC voltages, the low frequency alternating voltages during regeneration have amplitudes which are slightly larger than the amplitudes of the utility AC voltages and have phases which lead the utility AC voltages so that current passes from the DC to the AC sides of the rectifier. In this manner, braking power is returned to the utility grid.

Drawing current from and returning current to the utility grid can distort utility AC voltages and currents if the DC bus voltage is insufficient to generate low frequency alternating voltages at the rectifier inputs which are in phase and slightly greater than the utility supplied rectifier input voltages during regeneration and slightly less than the utility supplied rectifier input voltages during motoring.

To ensure required rectifier input voltages and minimize utility harmonics, DC bus voltage Vdc must be of a sufficiently large magnitude that voltage Vdc covers the line-to-line utility AC voltage VII plus any voltage drop across rectifier input reactors. To this end DC voltage Vdc is often chosen to be:

$$Vdc = 1.15(\sqrt{2}\ VII) \qquad \text{Eq. 1}$$

The factor 1.15 accounts for possible voltage drop across rectifier input reactors and for utility line voltage fluctuations (e.g. ±10%). In this case a utility AC voltage of 460 volts requires voltage Vdc of at least 748 volts.

Regenerative controllable rectifiers can be controlled to maintain a desired DC bus voltage independent of fluctuations in the utility AC voltage. To this end, a regenerative rectifier can be controlled as a function of utility AC voltages to alter the widths of the high frequency voltage pulses provided at the rectifier inputs. For example, assuming line-to-line utility voltage VII of 460 volts which is controlled to provide 748 volts Vdc, if the line-to-line utility voltage increases to 480 volts, DC voltage Vdc can be maintained at 748 volts by modifying high frequency pulse widths so that, despite change in utility line voltages, the currents drawn from the utility lines remain the same. Similarly, if regeneration provides charging current to the bus capacitor tending to increase Vdc, the regenerative rectifier can be controlled to modify the high frequency pulse widths to a suitable degree to maintain an essentially constant DC bus voltage Vdc.

Thus regenerative rectifiers are both more efficient than non-regenerative rectifiers and can be controlled to provide a constant DC bus voltage which does not fluctuate with utility voltage fluctuations and motor braking.

Unfortunately, regenerative rectifiers also have at least one important shortcoming. During inverter switching to convert DC bus voltage Vdc to AC voltage for driving the motor, switching losses are directly related to DC bus voltage level. Switching losses increase and less efficient switching occurs as DC bus voltage Vdc increases. Thus, higher DC bus voltages Vdc associated with regenerative rectifiers result in greater switching losses than non-regenerative rectifiers. In addition, increased DC bus voltage Vdc also increases overvoltages on the motor due to reflections on long supply lines.

BRIEF SUMMARY OF THE INVENTION

In order to avoid distorting utility line voltage and current, the DC bus voltage Vdc linked to a switch-mode rectifier must be of a sufficient level to cover the utility supplied rectifier input voltages. In order to cover the utility supplied rectifier input voltages, the DC bus voltage Vdc has to exceed a threshold value which is sufficiently high that the rectifier can be used to generate low frequency alternating voltages at the rectifier inputs which are essentially the same as the voltages at the inputs supplied by the utility lines for no load conditions. To the extent that DC bus voltage Vdc exceeds the voltage required to cover the utility supplied rectifier input voltages, bus voltage Vdc is higher than required and undesirably causes excessive switching losses. It has been recognized that when a switch mode rectifier is driven below a saturation level, the DC bus voltage Vdc is higher than required to cover the utility supplied rectifier input voltages.

The present invention monitors saturation of a switch mode rectifier and, when the rectifier is driven below a saturation level, reduces the commanded DC bus voltage level Vdc such that the rectifier is driven at a level closer to the saturated level. When rectifier control nears the saturation level, the minimum DC bus voltage required to cover the utility supplied rectifier input voltages is provided and the commanded DC bus voltage is stabilized. If there is a fluctuation in the utility line voltage, the present invention readjusts DC bus voltage Vdc to accommodate the fluctuation.

To regulate the DC bus voltage to the minimum voltage required to cover the utility supplied rectifier input voltage the present invention is used with a controller which receives a command DC bus voltage signal and regulates the DC bus voltage to the commanded DC voltage while generating rectifier input voltages which cover the utility supplied rectifier input voltages. At an initial commanded DC voltage level, the invention determines if the rectifier is near a saturated level of operation. If the rectifier is near the saturation level, the invention maintains the initial commanded voltage. However, if the rectifier is operating at a level below the saturated level, the commanded DC voltage is decreased until a level of operation near the saturated level is achieved. At any time, if the rectifier is operating at a saturated level, the commanded DC voltage is increased until either the rectifier is out of saturation or the commanded voltage level is equal to the initial level.

To identify the saturation level of operation, the present invention monitors and compares signals generated by current regulators. To this end, the present invention is meant to be used with a controller which uses the command signal to generate a synchronous signal set including synchronous d and q-axis voltage signals, uses the synchronous signal set to generate a stationary signal set including stationary d and q-axis voltage signals, and uses the stationary signal set to generate a modulating signal set including three modulating signals, one modulating signal corresponding to each rectifier leg. The controller also generates a high frequency triangle carrier signal for comparison to the modulating signal set. The controller compares each modulating signal to the carrier signal to generate control signals for a corresponding rectifier leg. The comparisons result in control signals which, when used to control the rectifier, cause high frequency voltage pulses at the rectifier inputs having average values over a carrier signal period which result in fundamental low frequency alternating voltages (i.e. line-to-line voltages) across rectifier inputs.

As is well known in the controls art, by increasing modulating signal amplitudes, low frequency line-to-line alternating voltage amplitudes are increased. Up to a saturation point, the low frequency line-to-line alternating voltage amplitudes are linearly related to modulating signal amplitudes. At saturation, the relationship between the two amplitudes becomes non-linear and further increasing the modulating signal amplitude causes non-sinusoidal line-to-line alternating voltages which in turn distort utility grid voltages and currents.

As is well known in the controls art, the term modulation index Mi refers to the ratio of the modulating signal amplitude to the peak carrier signal amplitude. The modulation index Mi at which saturation occurs depends upon the type of modulation used by the controller. For example, where the controller generates sinusoidal modulating signals, saturation begins when the modulation index Mi reaches 1.0. However, where the controller generates space vector or discontinuous PWM modulating signals, saturation typically begins when the modulation index Mi exceeds 1.154. The maximum modulation index prior to saturation will be referred to herein as index k.

According to the present invention, the rectifier saturation point can be determined by generating an amplitude signal which corresponds to a vector defined by each of the synchronous set, the stationary set and the modulating set of signals and comparing the amplitude signal to the peak carrier signal amplitude multiplied by index k. Herein the result from multiplying index k by the peak carrier signal amplitude will be referred to as a reference signal. Upon comparing the amplitude and reference signals, if the reference signal is greater than the amplitude signal the rectifier is operating below the saturation level and the DC bus voltage can therefore be reduced. The present invention reduces the DC bus voltage in this case. However, if the reference signal is less than the DC bus voltage, the rectifier is operating at a saturated level and the invention operates to increase the DC bus voltage until either the rectifier is out of saturation or the initial commanded voltage is achieved.

A primary object of the invention is to reduce the DC bus voltage to the minimum level required to cover utility supplied rectifier input voltages. To this end the present invention identifies and regulates minimum DC bus voltage by monitoring rectifier saturation while reducing commanded DC voltage. When the rectifier becomes saturated or nears saturation, the invention increases the commanded voltage slightly such that the bus voltage can still cover the utility supplied rectifier input voltages.

Another object of the invention is to achieve the aforementioned object inexpensively. To this end, no additional voltage sensors are required and essentially all functionality described herein can be implemented using software.

One other object is to provide a system wherein an operator can choose between having a converter which can regulate a constant DC bus voltage and a converter which can regulate variable DC bus voltage while still covering utility supplied rectifier input voltages.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

BRIEF DESCRIPTION OF THE SEVERAL VIEWS OF THE DRAWINGS

FIG. 2a is a graph illustrating an exemplary triangle carrier signal and an exemplary modulating signal and FIG. 2b is a graph illustrating exemplary high frequency voltage pulses and a resulting low frequency fundamental component alternating voltage generated by comparing the signals of FIG. 2a;

DETAILED DESCRIPTION OF THE INVENTION

In the description that follows, an "e" subscript denotes that a signal is referred to the synchronous frame of reference, an "s" subscript denotes that a signal is referred to the stationary frame of reference, an "*" superscript denotes that a signal is a command signal, an "F" subscript denotes a feedback signal, a "g" subscript denotes a rectifier generated voltage and a "'" denotes a utility supplied voltage. Also, referring to FIG. 1, for the purposes of this explanation, utility supplied voltages on input lines 48, 50 and 52 will be referred to herein as supplied voltages $e'_1, e'_2$ and $e'_3$ while the line-to-line voltages resulting from supplied voltages $e'_1, e'_2$ and $e'_3$ will be referred to as line-to-line supplied voltages $V'_{ll}$. Each of lines 48, 50 and 52 is linked to a separate rectifier input line 5, 7 and 9, by a separate inductance choke $L_1$, $L_2$, and $L_3$, respectively. Voltages generated by rectifier 12 on input lines 48, 50 and 52 will be referred to herein as generated voltages $e_{1g}$, $e_{2g}$ and $e_{3g}$ while line-to-line voltages resulting from generated voltages $e_{1g}$, $e_{2g}$ and $e_{3g}$ will be referred to as line-to-line generated voltages $V_{llg}$.

Throughout the drawings and in the description which follows like reference numbers and characters are used to identify like system components, signals and waveforms.

While the following description details various blocks, steps, and functions, it should be remembered that all of these elements are meant to be implemented in software as computer programs and represent algorithms for execution by a conventional-type digital processor adapted for industrial applications, such as a model 8086 microelectronic processor as supplied by Intel Corporation of Santa Clara, Calif.

A. Theory

Figure 1:
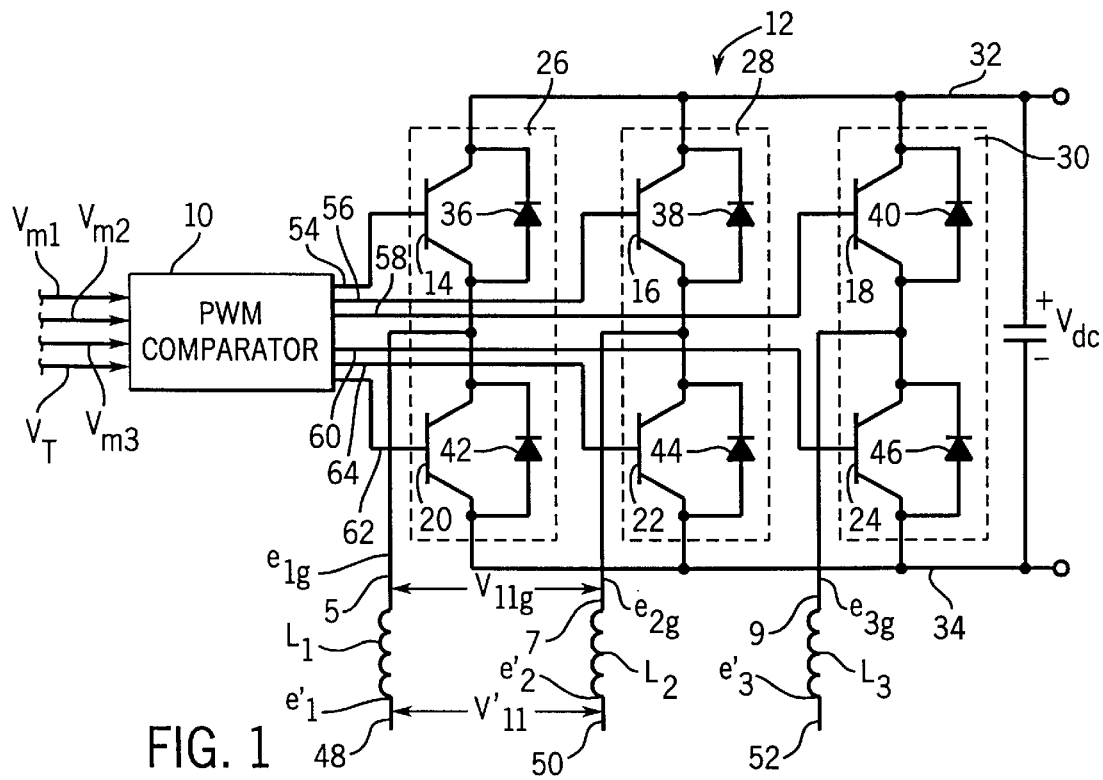
FIG. 1 is a schematic diagram of a PWM comparator and a switch mode rectifier.

Referring to FIG. 1, a conventional PWM comparator 10 and switch-mode rectifier 12 are illustrated. A utility grid (not illustrated) provides sinusoidal supplied voltages $e'_1, e'_2$ and $e'_3$ on lines 48, 50 and 52, respectively. Line-to-line voltages $V'_{ll}$ are sinusoidal. To minimize harmonics in the utility grid, line-to-line voltages $V_{llg}$ must be the same frequency as the line-to-line supplied voltages $V'_{ll}$ and the line-to-line generated voltages $V_{llg}$ and line-to-line supplied voltages $V'_{ll}$ must have very similar amplitudes. For example, during motoring with a unity power factor, to draw current from lines 48, 50 and 52, line-to-line generated voltages $V_{llg}$ should be in phase with supplied voltages $V'_{ll}$ and have slightly less amplitude. Similarly, during regeneration, to return current to lines 48, 50 and 52, line-to-line generated voltages $V_{llg}$ should be in phase with line-to-line supplied voltages $V'_{ll}$ and have slightly greater amplitude. In addition, it follows that because line-to-line supplied voltages $V'_{ll}$ are sinusoidal, fundamental line-to-line generated voltages $V_{llg}$ should likewise be sinusoidal to minimize distortion of utility line voltages and currents.

Rectifier 12 is linked to positive and negative DC bus rails 32, 34, respectively, and can be controlled to connect rails 32 and 34 to lines 48, 50 and 52 such that a pattern of high frequency DC voltage pulses are provided on each of lines 48, 50 and 52. The pulse patterns can be controlled such that the fundamental values of the high frequency pulses result in low frequency alternating voltages, herein generated voltages $e_{1g}$, $e_{2g}$ and $e_{3g}$, on lines 48, 50 and 52, respectively.

Given a specific DC bus voltage $V_{dc}$ level, rectifier 12 can generate line-to-line generated voltages $V_{llg}$ having amplitudes within a range of values. For the purposes of this explanation the maximum amplitude of a line-to-line generated voltage $V_{llg}$ is of interest. The maximum amplitude can be achieved by controlling rectifier 12 to increase the widths of high frequency voltage pulses to widths just shy of the point where the fundamental line-to-line generated voltages $V_{llg}$ do not proportionally follow the command $V_{ml}$. The point at which the fundamental line-to-line generated voltages do not proportionally follow the command voltage $V_{ml}$ is referred to within the controls art as the saturation point. For example, assuming a 700 volt DC bus voltage $V_{dc}$, rectifier 12 can be used to generate a maximum sinusoidal fundamental line-to-line generated voltage $V_{llg}$ of 495 volts AC prior to saturation.

Fundamental line-to-line generated voltages $V_{llg}$ less than 495 volts AC can be achieved by reducing the widths of the high frequency voltage pulses on lines 48, 50 and 52 thereby reducing the amplitudes of generated voltages $e_{1g}$, $e_{2g}$ and $e_{3g}$. For example, if the line-to-line supplied voltages $V'_{ll}$ where 460 volts AC, pulse width could be reduced to generate fundamental line-to-line generated voltages $V_{llg}$ having amplitudes which are slightly greater than or less than the line-to-line supplied voltages, depending on whether the rectifier is motoring or regenerating. The 700 volt bus voltage $V_{dcC}$ is said to "cover" a 460 volt line-to-line supplied voltage $V'_{ll}$ because it can generate a line-to-line generated voltage $V_{llg}$ greater than the fundamental line-to-line supplied voltage $V_{ll}$.

While a 700 volt DC bus voltage $V_{dc}$ can cover a 460 volt line-to-line supplied voltage $V'_{ll}$, clearly lesser bus voltage levels can achieve the same purpose. For example, given a 460 volt line-to-line supplied voltage $V'_{ll}$, a 650 volt DC bus voltage could cover the supplied voltage $V'_{ll}$. The present invention modifies the DC bus voltage such that the resulting DC bus voltage is the minimum level required to cover the line-to-line supplied voltage. An understanding of how rectifier 12 operates to provide fundamental line-to-line generated voltages $V_{llg}$ across lines 48, 50 and 52 aids in understanding how the present invention modifies the DC bus voltage.

Referring still to FIG. 1, rectifier 12 includes six switches (e.g. IGBTs, BJTs, etc.) 14, 16, 18, 20, 22 and 24 arranged in series pairs to form three parallel legs 26, 28, 30, each leg traversing between positive and negative DC rails 32, 34, respectively, of a DC bus. Six diodes 36, 38, 40, 42, 44 and 46 are connected in inverse parallel relationship with switches 14–24, one diode 36–44 for each switch 14–24. Rectifier input lines 48, 50 and 52 are linked to legs 26, 28, 30, one line linked to each leg at a node between corresponding switches. For example, line 48 is connected to a node between switches 14 and 20.

Comparator 10 has six control lines 54, 56 58, 60, 62 and 64, each control line linked to a separate one of switches 14–24, respectively. Comparator 10 provides control signals on lines 54–64 to open and close switches 14–24 in a controlled fashion thereby providing DC bus voltage $V_{dc}$ to associated input lines 48, 50 and 52 generating high frequency voltage pulses thereon.

Comparator 10 receives three modulating signals $V_{m1}$, $V_{m2}$, and $V_{m3}$ and a high frequency triangle carrier signal $V_T$, a separate modulating signal $V_{m1}$, $V_{m2}$ and $V_{m3}$ corresponding to each of legs 26, 8 and 30. Comparator 10 compares each modulating signals $V_{m1}$, $V_{m2}$ and $V_{m3}$ to carrier signal $V_T$ to generate control signals for a corresponding leg 26, 28 or 30. In the interest of simplifying this explanation, as each leg 26, 28 and 30 operates in the same fashion and each comparison of a modulating signal to carrier signal $V_T$ to generate control signals for a leg is essentially identical, only leg 26, signals related thereto and comparator operation related thereto will be explained here.

Figure 2A:
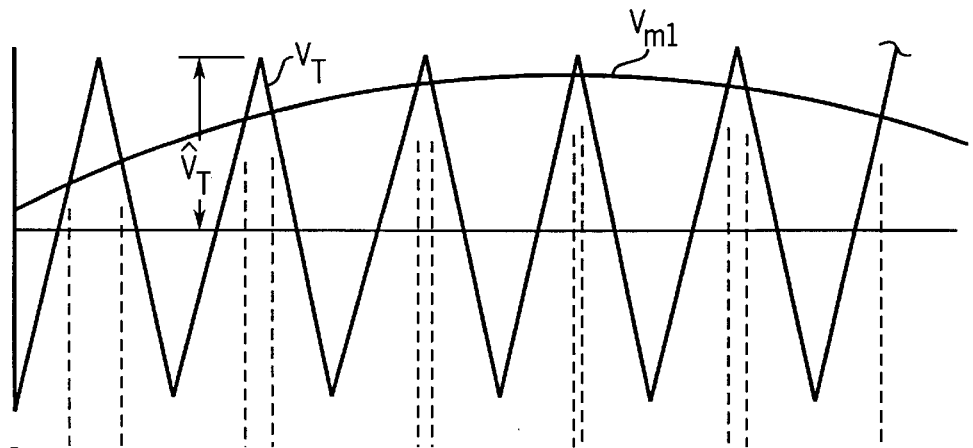
Figure 2B:
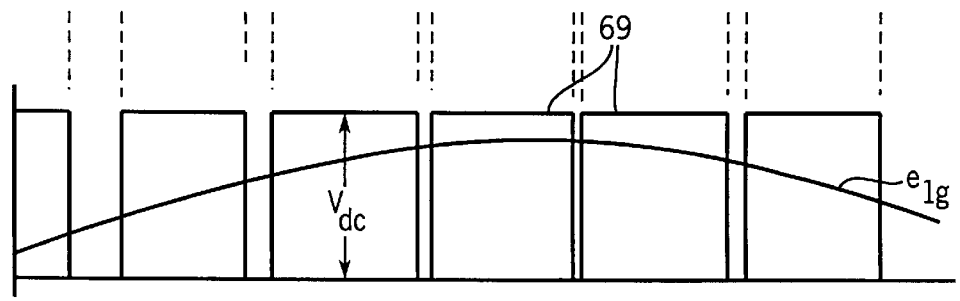

Referring also to FIG. 2a, exemplary signals including a modulating signal $V_{m1}$ corresponding to leg 26 and a carrier signal $V_T$ are illustrated. Signal $V_{m1}$ is sinusoidal (only a portion of one positive half cycle is illustrated). Comparator 10 operates as follows. During positive half cycle of modulating signal $V_{m1}$, when modulating signal $V_{m1}$ is greater than signal $V_T$, comparator 10 generates two signals, one signal on line 54 to close switch 14 and a second signal on line 62 to open switch 20. Referring also to FIG. 2b, when switch 14 is closed, line 48 is linked to the positive DC bus 32 and DC bus voltage $V_{dc}$ is provided on line 48. When modulating signal $V_{m1}$ is less than carrier signal $V_T$, comparator 10 opens switch 14 and closes switch 20 thereby removing DC bus voltage $V_{dc}$ from line 48 and placing voltage $-V_{dc}$ on line 48. During negative half cycles of voltage $V_m$, (not illustrated), similar control occurs, the result being voltage pulses 69 which are low (i.e. $-V_{dc}$) for greater periods than they are high (i.e. $+V_{dc}$). Thus, a series of positive high frequency voltage pulses 69 are generated on line 48 with average values proportional to $V_{m1}$. The fundamental value of pulses 69 result in a low frequency alternating generated voltage $e_{1g}$ on line 48. Voltages $e_{1g}$, $e_{2g}$ and $e_{3g}$ together balance to generate line-to-line fundamental voltages $V_{llg}$.

With switch mode rectifier 12, given a specific DC bus voltage $V_{dc}$, rectifier 12 can be used to generate line-to-line voltages $V_{llg}$ having amplitudes within a specific range. Different line-to-line voltages $V_{llg}$ are achievable by modifying modulating signals $V_{m1}$, $V_{m2}$ and $V_{m3}$. For example, referring again to FIGS. 2a and 2b, assuming modulating signal $V_{m1}$ generates rectifier input voltage $e_{1g}$. By increasing the amplitude of signal $V_{m1}$, voltage $e_{1g}$ can be increased. This is because as signal $V_{m1}$ amplitude is increased, the widths of pulses 69 are increased there by causing their RMS value to rise. When voltages $e_{1g}$, $e_{2g}$ and $e_{3g}$ increase, the line-to-line voltages $V'_{ll}$ likewise increase. Thus, assuming a line-to-line supplied voltage $V'_{ll}$ of 460 volts AC, rectifier 12 can be used to generate the 460 volts $V_{llg}$ required to cover the line-to-line supplied voltage $V'_{ll}$.

Referring still to FIGS. 2a and 2b, assume the DC bus voltage $V_{dc}$ is decreased. If modulating signal $V_{m1}$ remains unchanged, the amplitude of voltage $e_{1g}$ will decrease as the amplitude of voltage $e_{1g}$ is dependent on the amplitudes of high frequency pulses 69. Likewise, when bus voltage $V_{dc}$ is decreased, the amplitudes of voltages $e_{2g}$ and $e_{3g}$ also decrease. When voltages $e_{1g}$, $e_{2g}$ and $e_{3g}$ decrease, generated line-to-line voltages $V_{llg}$ also decrease.

Up to the saturation point, modulating signal $V_{m1}$ can be modified to compensate for reduced DC bus voltage $V_{dc}$ to maintain voltage $e_{1g}$ at the level illustrated and thereby maintain voltages $V_{llg}$. To this end, where DC bus voltage $V_{dc}$ is reduced, the amplitude of modulating signal $V_{m1}$ can be increased thereby increasing the widths of high frequency pulses 69. When pulse widths are increased, the amplitudes of the resulting fundamental generated voltages $e_{1g}$, $e_{2g}$, and $e_{3g}$ increase and thus the amplitudes of line-to-line generated voltages $V_{llg}$ likewise increase.

How close rectifier 12 is to saturation and in fact if rectifier 12 is operating in saturation can be determined by comparing a derivative of modulating signals $V_{m1}$, $V_{m2}$ and $V_{m3}$ to a peak value $\hat{V}_T$ of carrier signal $V_T$. Modulating signals $V_{m1}$, $V_{m2}$ and $V_{m3}$ can be represented by d and q-axis stationary voltage signals $V_{ds}$ and $V_{qs}$, respectively, by performing a 3-to-2 phase transformation. Equations for accomplishing this transformation are well known in the art and will not be explained here in detail. Suffice it to say that one circuit which could be used to perform a 3-to-2 phase transformation has been described in "Control Methods For Good Dynamic Performance Induction Motor Drives Based On Current And Voltage As Measured Quantities" by Robert Joetten and Gerhard Maeder and published in IEEE-IAS Transactions, IA–19, No. 3, May/June 1983.

Figure 3:
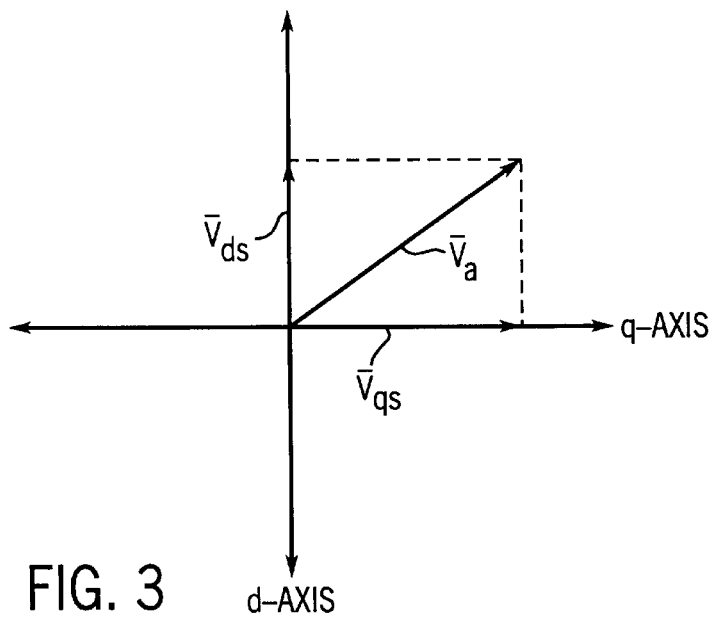
FIG. 3 is a graph illustrating vectorial representations of an exemplary one of three phase modulating signals and of exemplary d and q-axis stationary voltage signals associated therewith.

Referring to FIG. 3, the d and q axis voltage signals $\overline{V}_{ds}$ and $\overline{V}_{qs}$ can be represented by a pair of rotating d and q-axis vectors $\overline{V}_{ds}$ and $\overline{V}_{qs}$, respectively vectors $\overline{V}_{ds}$ and $\overline{V}_{qs}$ together define an amplitude vector $\overline{V}_a$ having a magnitude $\hat{V}_a$. Magnitude $\hat{V}_a$ will be referred to herein as amplitude signal $\hat{V}_a$. Saturation can be identified by comparing amplitude signal $\hat{V}_a$ and value $\hat{V}_T$ multiplied by a constant k where the value of k depends on the type of modulation employed to generate rectifier control signals. For example, for sinusoidal triangle comparison PWM (TCPWM), k is typically 1.0. For space vector PWM or discontinuous PMM methods constant k is typically 1.154. The value $k\hat{V}_T$ will be referred to herein as reference signal $k\hat{V}_T$.

Thus, the degree to which bus voltage $V_{dc}$ can be reduced without causing rectifier saturation is limited to the point where amplitude signal $\hat{V}_a$ is equal to reference signal $k\hat{V}_T$.

According to the present invention, with DC bus voltage $V_{dc}$ regulated to a commanded DC voltage level, amplitude signal $\hat{V}_a$ is determined and compared to reference signal $k\hat{V}_T$. When amplitude signal $\hat{V}_a$ is less than reference signal $k\hat{V}_T$, the commanded DC bus voltage is reduced. During bus voltage reduction, amplitude signal $\hat{V}_a$ is repetitively determined and compared to reference signal $k\hat{V}_T$. Once amplitude signal $\hat{V}_a$ is equal to reference signal $k\hat{V}_T$ so that the rectifier is at the saturation point, the commanded DC bus voltage is held at that level. Preferably, constant K is chosen so that rectifier 12 operates at a level slightly below saturation so that the DC bus voltage $V_{dc}$ can cover instantaneous jumps in the line-to-line supplied voltage $V'_{ll}$.

Thus, the present invention reduces the DC bus voltage to a level slightly greater than the level required to cover the utility supplied line-to-line input voltage $V'_{ll}$.

B. Hardware and Operation

Figure 4:
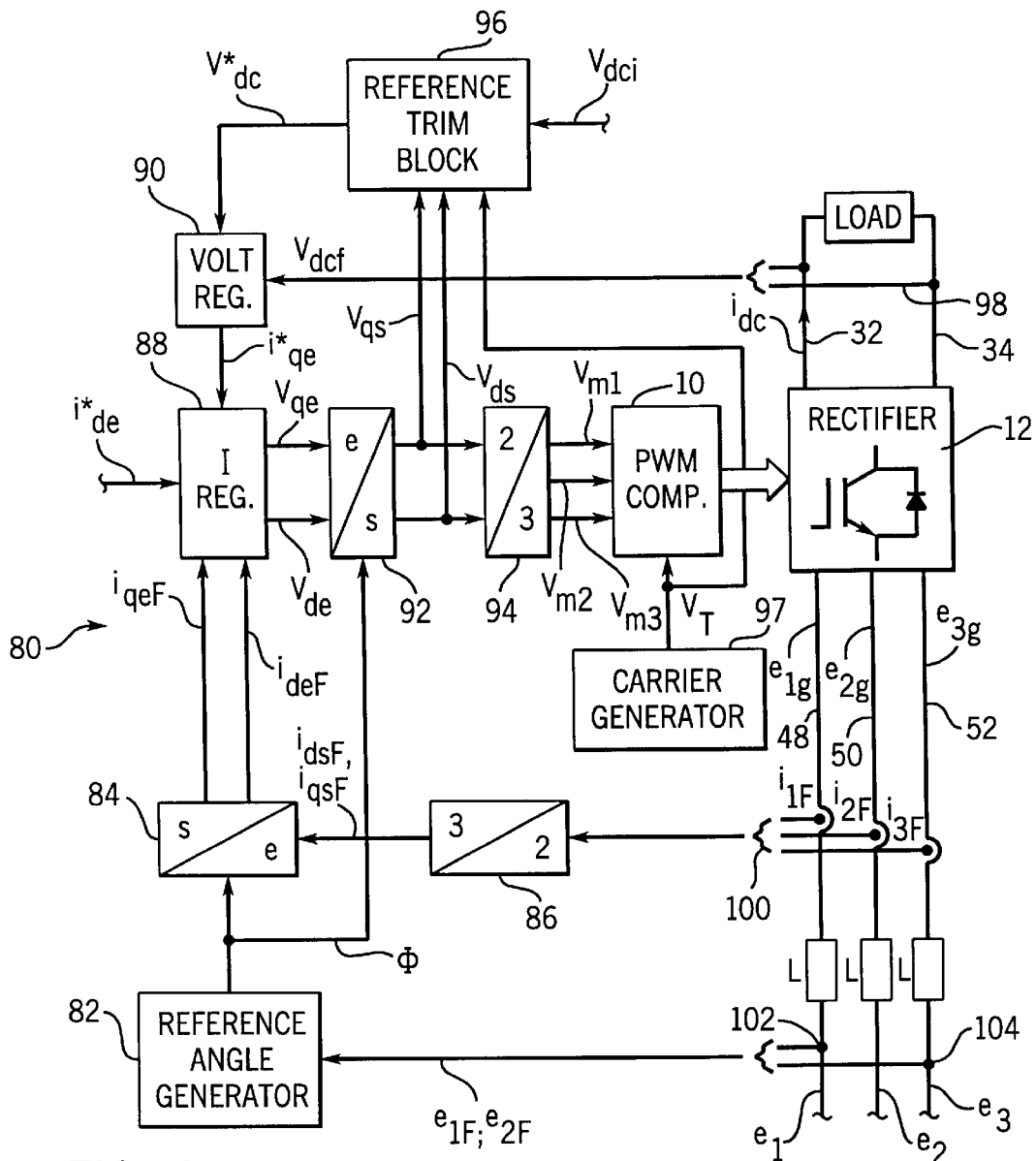
FIG. 4 is a schematic diagram of a rectifier controller incorporating the inventive reference trim regulator.

Referring now to FIG. 4, the inventive rectifier controller will be described in the context of a switch mode rectifier assembly 80 linked to a three phase utility grid via three inductors collectively referred to by the letters L..

Assembly 80 includes a reference angle generator 82, a stationary-to-synchronous transformer 84, a 3-to-2 phase transformer 86, a current regulator 88, a voltage regulator 90, a synchronous-to-stationary transformer 92, a two-to-three phase transformer 94, pulse width modulation comparator 10 linked to rectifier 12, a reference trim block 96 and a carrier signal generator 97.

Generally, voltage regulator 90 receives a DC bus voltage command signal $V_{dc}^*$ and a DC bus voltage feedback signal $V_{dcF}$ and generates a synchronous q-axis current command signal $i_{qe}^*$ which is calculated to modify control of rectifier 12 such that the actual DC bus voltage (as represented by feedback signal $V_{dcF}$) is equal to the commanded DC bus voltage $V_{dc}^*$. In addition, current regulator 88 generates rectifier control signals which cause rectifier 12 to generate line-to-line generated voltages $V_{llg}$ on rectifier input lines 48, 50 and 52 which are related and at no load are essentially identical to line-to-line supplied voltages $V'_{ll}$ across lines 48, 50 and 52 (see also FIG. 1).

To this end, assembly 80 receives three separate sets of feedback signals. First, a voltage sensor 98 is provided across DC rails 32 and 34 to provide DC voltage feedback signal $V_{dcF}$ to regulator 90. Second, three 30 separate current sensors (e.g. hall effect sensors) collectively referred to by numeral 100 are linked to rectifier input lines 48, 50 and 52 and sense rectifier input currents $i_1$, $i_2$ and $i_3$ (not illustrated). Three current feedback signals $i_{1F}$, $i_{2F}$ and $i_{3F}$ indicative of currents $i_1$, $i_2$ and $i_3$ are provided to phase transformer 86. Third, two of the three utility line voltages (e.g. $e_1$ and $e_3$) are sensed via separate voltage sensors 102 and 104, representative feedback signals $e_{1F}$ and $e_{3F}$ are provided to angle generator 82 to generate a reference angle $\Phi$ which is synchronized with utility line voltages $e_1$, $e_2$ and $e_3$. Angle generator 82 provided reference angle $\Phi$ to both stationary-to-synchronous transformer 84 and synchronous-to-stationary transformer 92.

Transformer 86 performs a 3-to-2 phase transformation on current feedback signals $i_{1F}$, $i_{2F}$ and $i_{3F}$ producing d and q-axis stationary feedback current signals $i_{dsF}$, $i_{qsF}$, respectively. Three-to-2 phase transformations are well known in the art. Feedback signals $i_{dsF}$ and $i_{qsF}$, are received by stationary-to-synchronous transformer 84 which transforms the currents from the stationary reference frame to the synchronous reference frame producing synchronous feedback current signals $i_{qeF}$ and $i_{deF}$ in a manner which is well known in the art. Regulator 26 may take many different forms. One preferred form is described in U.S. Pat. No. 4,680,695 which issued on Jul. 14, 1987 to Kerkman, et al. and entitled "Cross-Coupled Current Regulator".

Regulator 88 receives synchronous q-axis command current signal $i_{qe}^*$ from regulator 90 and the synchronous q and d-axis feedback current signals $i_{qeF}$ and $i_{deF}$ from transformer 84. Regulator 88 also received an input synchronous d-axis command current signal $i_{de}^*$. Regulator 88 compares feedback signals $i_{deF}$ and $l_{qeF}$ to command signals $i_{de}^*$ and $i_{qe}^*$ and generates synchronous voltage signals $V_{qe}$ and $V_{de}$ which are calculated to eliminate any difference between feedback signals $i_{deF}$, $i_{qeF}$ and command signals $i_{de}^*$ and $i_{qe}^*$. In this manner, rectifier control signals are generated which cause the line-to-line rectifier generated voltages $V_{llg}$ to balance the line-to-line supplied voltages $V'_{ll}$ across lines 48, 50 and 52 and voltage drops on inductors $L_1$, $L_2$ and $L_3$.

Signals $V_{qe}$ and $V_{de}$ are provided to synchronous to stationary transformer 92 which transforms signals $V_{qe}$ and $V_{de}$ into stationary d and q-axis voltage signals $V_{ds}$ and $V_{qs}$ (see also FIG. 3). Transformer 94 receives stationary signals $V_{ds}$ and $V_{qs}$ and performs a 2-to-3 phase transformation thereby generating modulating signals $V_{m1}$, $V_{m2}$ and $V_{m3}$. For converting voltage signals from two-to-three phase, a circuit like the one described in "Control and Simulation of a Current Fed Linear Induction Machine" by B. K. Bose and Thomas Lipo published in IEEE-IAS Conference Record, pp. 876–883, 1978, may be employed.

Referring to FIGS. 2a and 4, carrier generator 97 generates a triangle carrier signal $V_T$ having a peak amplitude $\hat{V}_T$.

Referring also to FIGS. 1 and 2b, comparator 10 receives modulating signals $V_{m1}$, $V_{m2}$ and $V_{m3}$ and carrier signal $V_T$ and compares each modulating signal $V_{m1}$, $V_{m2}$ and $V_{m3}$ to carrier signal $V_T$ to generate control signals for controlling rectifier 12 switches in the manner described above.

With the trim block 96 reference excepted, all of the hardware described above in reference to FIG. 4 is conventional.

Figure 5:
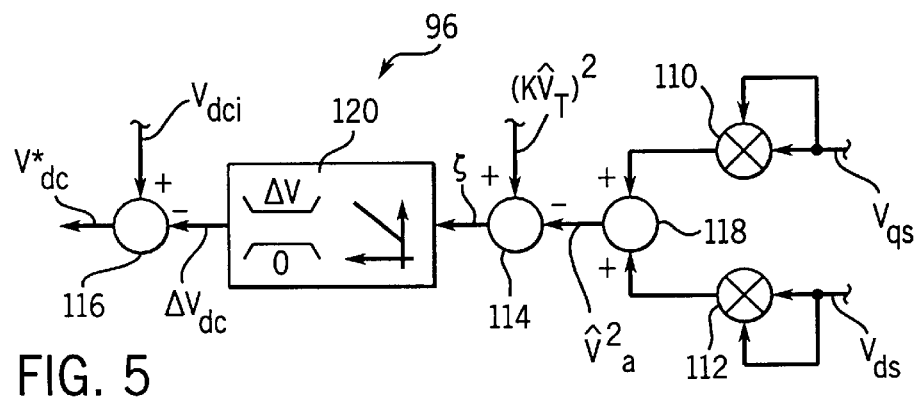
FIG. 5 is a schematic diagram of one embodiment of the trim regulator of FIG. 4.

Referring now to FIGS. 4 and 5, block 96 receives both the stationary d and q-axis voltage signals $V_{ds}$ and $V_{qs}$ and an initial DC bus voltage command signal $V_{dci}$ and uses those signals to modify command voltage signal $V_{dc}^*$. To this end, referring again to FIG. 3, block 96 calculates the amplitude signal $\hat{V}_b$ by solving the following equation:

$$\hat{V}_a = \sqrt{V_{qs}^2 + v_{ds}^2} \qquad \text{Eq. 2}$$

Then, block 96 compares amplitude signal $\hat{V}_a$ to reference signal $k\hat{V}_T$ to determine if rectifier 12 is near the saturation point. When rectifier 12 is near the saturation point, block 96 does not modify DC command voltage signal $V_{dc}^*$. However, when rectifier is not near saturation, block 96 decreases command voltage signal $V_{dc}^*$ until the saturation point is nearly achieved.

While Equation 2 could be solved to generate amplitude signal $\hat{V}_a$, because it is complex to take a square root using typical controller processes, instead, the following equation is preferably solved:

$$\hat{V}_a^2 = V_{ds}^2 + V_{qs}^2 \qquad \text{Eq. 3}$$

Then, reference signal $k\hat{V}_T$ is squared and values $(k\hat{V}_T)^2$ and $\hat{V}_a^2$ are compared. To regulate command voltage signal $V_{dc}{}^*$, block 96 includes first and second multipliers 110, 112, a first summer 114, a second summer 116, a third summer 118 and a regulator 120. Multiplier 110 receives signal $V_{qs}$ and squares that signal generating value $V_{qs}{}^2$. Similarly, multiplier 112 receives signal $V_{ds}$ and squares that signal generating value $V_{ds}{}^2$. Third summer 118 then adds values $V_{qs}{}^2$ and $V_{ds}{}^2$ solving Equation 3 and thereby generating an amplitude signal $\hat{V}_a^2$.

First summer 114 receives reference signal $(k\hat{V}_T)^2$ and amplitude signal $\hat{V}_a^2$ and subtracts amplitude signal $\hat{V}_a^2$ from reference signal $(k\hat{V}_T)^2$ generating an error signal $\xi$. Regulator 120 receives error signal $\xi$.

Based on error signal $\xi$, regulator 120 generates a correction signal $\Delta V_{dc}$ having a value within a range between zero and a maximum correction value $\Delta V$.

Second summer 116 receives initial command voltage signal $V_{dci}$ and correction signal $\Delta V_{dc}$ and subtracts correction signal $\Delta V_{dc}$ from initial signal $V_{dci}{}^*$ thereby generating a modified command voltage signal $V_{dc}{}^*$ for input to regulator 90.

Referring still to FIGS. 4 and 5, on one hand, if error signal $\xi$ is positive because amplitude signal $\hat{V}_a^2$ is less than reference signal $(k\hat{V}_T)^2$, rectifier 12 is operating far from its saturation level. In this case regulator 120 increases the value of the correction signal $\Delta V_{dc}$, but will not increase signal $\Delta V_{dc}$ past maximum value $\Delta V$.

When correction signal $\Delta V_{dc}$ is increased, command bus voltage signal $V_{dc}{}^*$ is reduced. Command bus voltage signal $V_{dc}{}^*$ is reduced until amplitude signal $\hat{V}_a^2$ is equal to reference signal $(k\hat{V}_T)^2$. Preferably, maximum value $\Delta V$ can be selected to be equal to the difference between initial command voltage $V_{dci}$ and the DC bus voltage which would be generated using a six step diode bridge.

On the other hand, if error signal $\xi$ is negative because amplitude signal $\hat{V}_a^2$ is greater than reference signal $(k\hat{V}_T)^2$, rectifier 12 is closer to the saturation point than desired or may in fact be beyond the saturation point. In this case regulator 120 starts to reduce correction signal $\Delta V_{dc}$, driving signal $\Delta V_{dc}$ toward the zero level. When correction signal $\Delta V_{de}$ is reduced, command bus voltage signal $V_{dc}{}^*$ increases and approaches the level of initial command signal $V_{dci}$. Initial command voltage $V_{dci}$ can be selected to be equal to the DC bus voltage desired in a fixed bus voltage operation mode.

Figure 6:
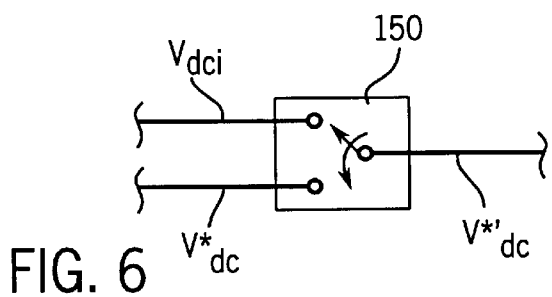
FIG. 6 is a schematic diagram of a switch which can be used with the rectifier of FIG. 1 to switch between constant or controllable DC bus values.
Figure 11:
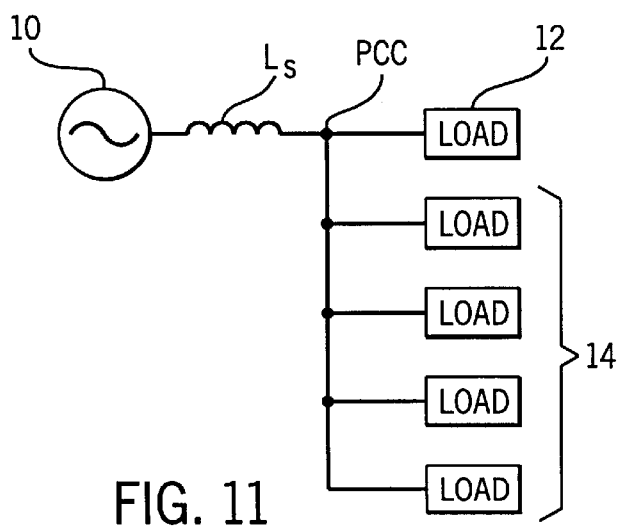
FIG. 11 is a schematic diagram illustrating a plurality of loads linked to a utility supply at a point of common coupling.

Referring now to FIGS. 4 and 6, if desired, a simple switch 150 can be provided between block 96 and regulator 90 for selecting either the output of block 96 (i.e. $V_{dc}{}^*$) or initial command voltage signal $V_{dci}$ for controlling regulator 90. In this manner, a system operator can select between having either a constant and fixed DC bus voltage by selecting $V_{ci}$ as an input $V_{dc}{}^*$ to regulator 90 or the trimmed DC bus voltage $V_{dc}{}^*$ as input $V_{dc}{}^*$.

C. Results

Figure 7:
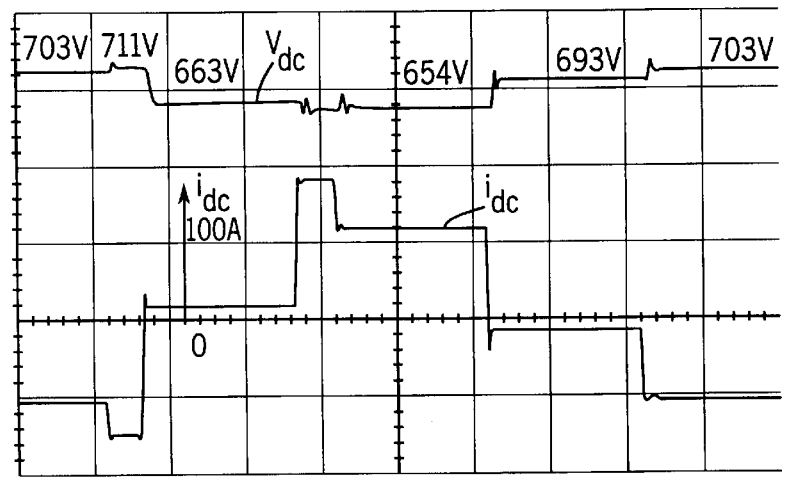
FIG. 7 is a graph illustrating exemplary DC bus voltage and DC load current waveforms with the trim regulator of FIG. 4 operating.

Referring now to FIGS. 5 and 7, therein two waveforms are illustrated including a DC load current $i_{dc}$ having various values and a corresponding DC bus voltage $V_{dc}$ which is regulated by trim block 96. Load current $i_{dc}$ includes some periods during motoring and other periods during regeneration. The initial DC bus command voltage $V_{dci}$ was set to 748 volts. Clearly, block 96 regulated command voltage $V_{dc}{}^*$ to levels far below the initial command voltage $V_{dci}$. In fact, as illustrated, the highest DC bus voltage $V_{dc}$ was 711 volts during regeneration with 1.5 times rated current. The lowest DC bus voltage $V_{dc}$ was 654 volts.

Figure 8A:
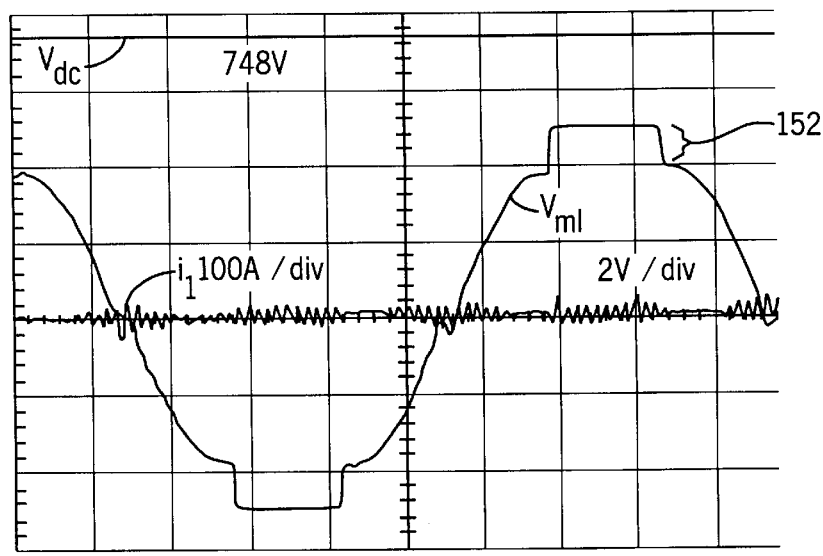
FIG. 8a is a graph illustrating exemplary rectifier input current and an associated modulating signal waveform for one rectifier phase at no load conditions with the trim regulator of FIG. 5 enabled and FIG. 8b is similar to FIG. 8a albeit with the trim regulator of FIG. 5 disabled.

Referring now to FIGS. 4 and 8a, waveforms representing electrical parameters associated with rectifier 12 while trim block 96 is disabled and the initial commanded DC bus voltage signal $V_{dci}$ is set at a fixed bus voltage of 748 volts, are illustrated. The two illustrated signals include line current $i_1$, on line 48 and a corresponding modulating signal $V_{m1}$. There is a clear discontinuity in modulating signal $V_{m1}$ which is identified by numeral 152. Discontinuity 152 is an indication of how far rectifier 12 is from the saturation point.

Figure 8B:
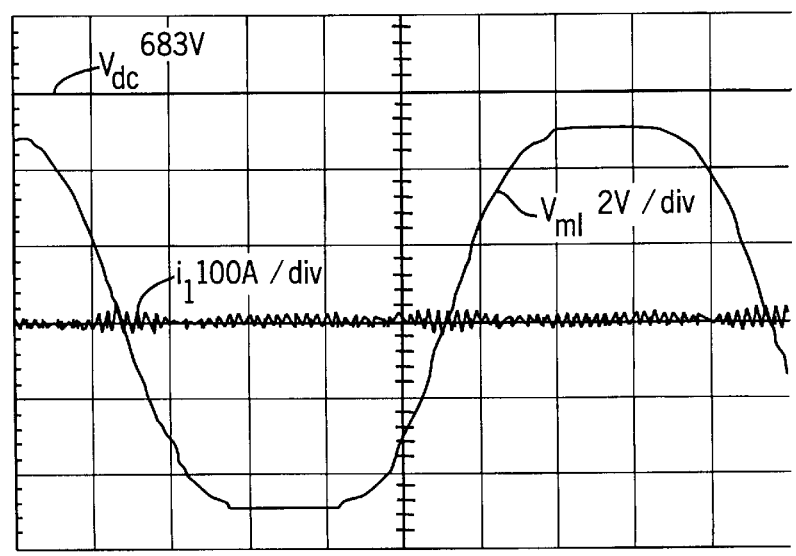

Referring now to FIGS. 4 and 8b, waveforms like those of FIG. 8a are illustrated, albeit with trim block 96 enabled. With trim block 96 enabled, DC voltage $V_{dc}$ is reduced to 683 volts. Comparing modulating signal $V_{m1}$ in FIGS. 8a and 8b, it can be seen that when DC bus voltage $V_{dc}$ is reduced from 748 volts to 683 volts, the discontinuity 152 in FIG. 8a is essentially eliminated, thereby indicating that rectifier 12 is operating near the saturated level. Because DC voltage $V_{dc}$ is reduced from 748 volts to 683 volts, switching losses are appreciably reduced.

Figure 9A:
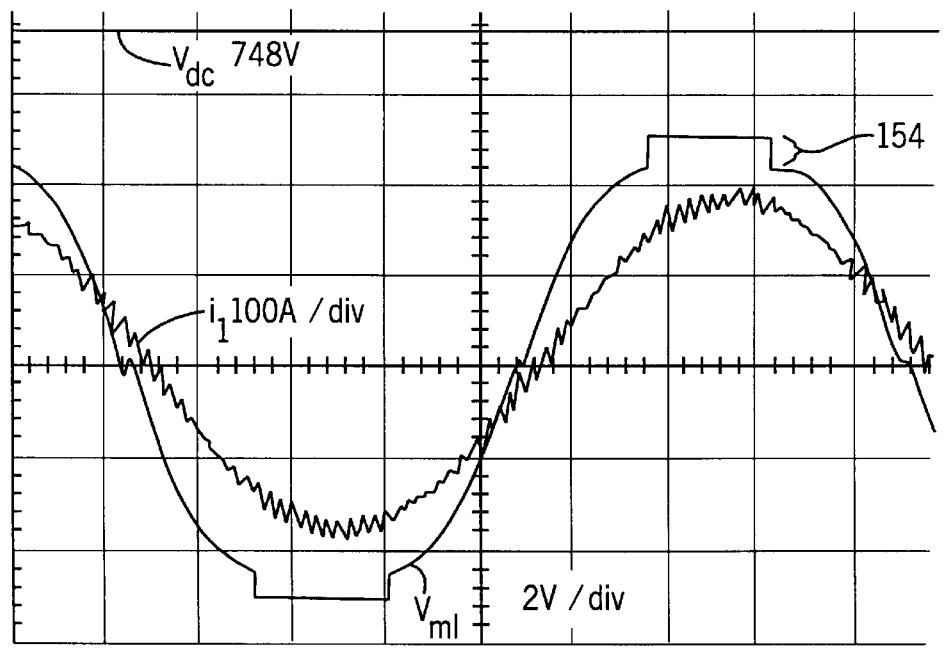
FIG. 9a is a graph illustrating exemplary rectifier input current and an associated modulating signal waveform for one rectifier phase during regeneration with the trim regulator of FIG. 5 disabled and FIG. 9b is similar to FIG. 9a, albeit during motoring.
Figure 9B:
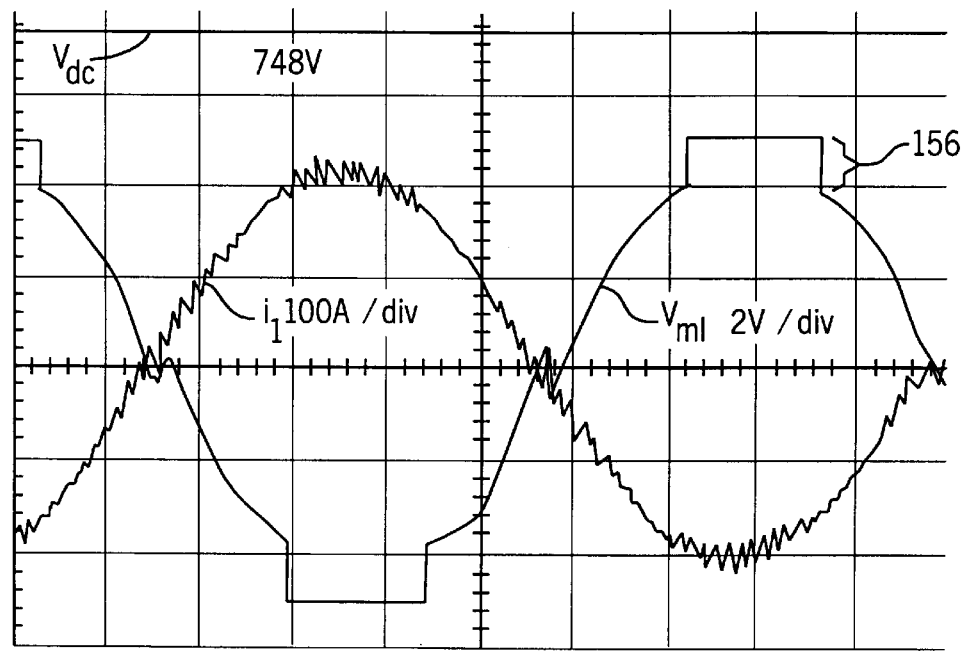

Referring now to FIG. 9a, waveforms representing line current $i_1$ and a modulating signal $V_{m1}$ during regeneration with trim block 96 disabled and a fixed DC bus voltage $V_{dc}$ of 748 volts are illustrated. Once again, a discontinuity 154 occurs in modulating signal $V_{m1}$ indicating that rectifier 12 is not near its saturation point. Similar wave forms representing line current $i_1$ and modulating signal $V_{m1}$ are illustrated in FIG. 9b during motoring. Here the discontinuity 156 is even greater than during regeneration.

Figure 10A:
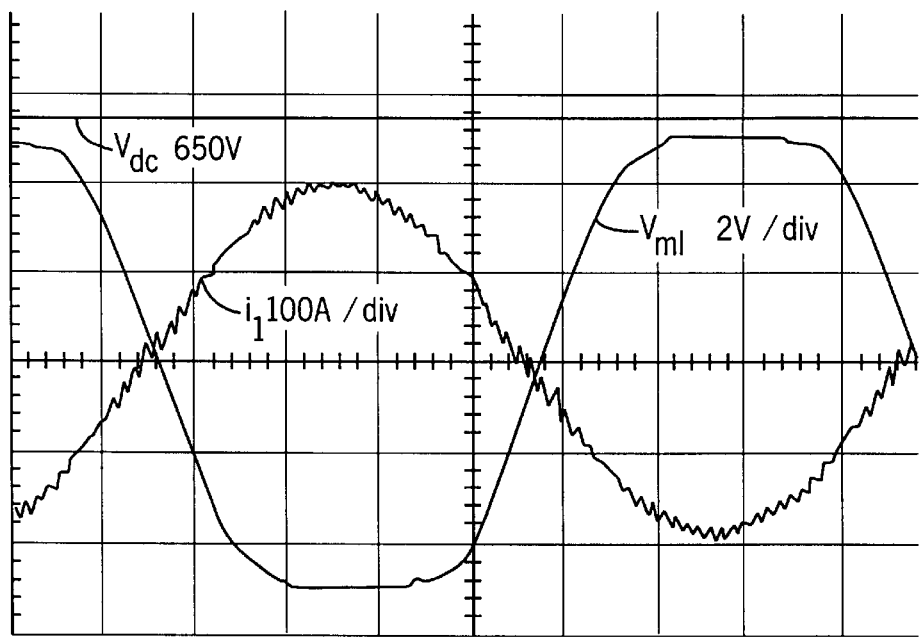
FIG. 10a is similar to FIG. 9a, albeit with the trim regulator of FIG. 5 enabled
Figure 10B:
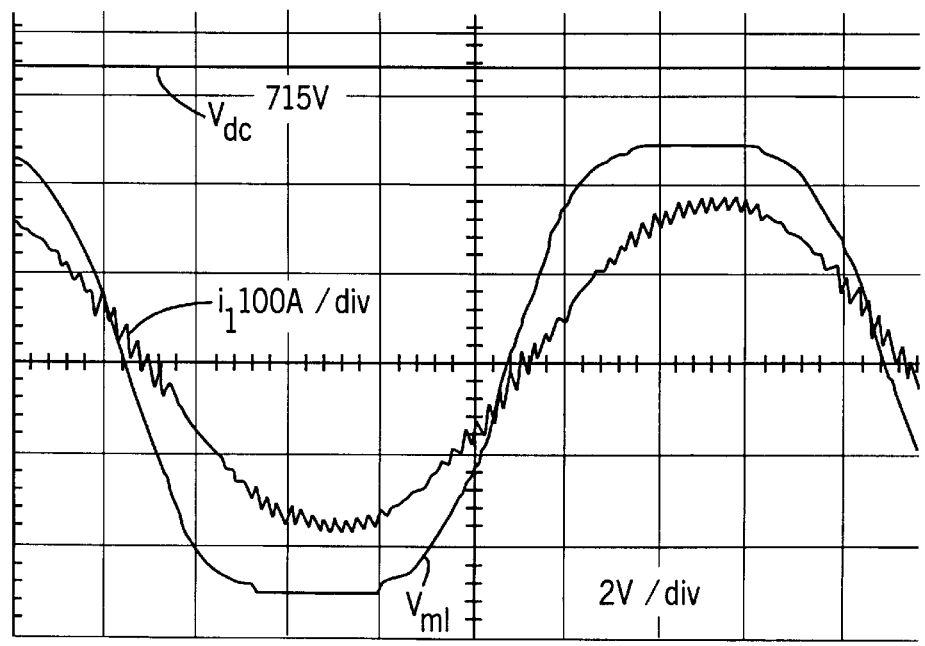
FIG. 10b is similar to FIG. 9b albeit with the trim regulator of FIG. 5 enabled.

Referring now to FIGS. 10a and 10b, line current waveforms $i_1$ and modulating signals $V_{m1}$ during regeneration (FIG. 10b) and motoring (FIG. 10a) are illustrated. Here, however, referring also to FIG. 4, trim block 96 has been enabled so that DC bus voltage $V_{dc}$ is reduced to the minimum possible level attainable without driving rectifier 12 into saturation. Once again, comparing FIG. 10b to FIG. 9a and FIG. 10a to FIG. 9b, the discontinuities 154 and 156 present in FIGS. 9a and 9b when trim block 96 was disabled are non-existent in FIGS. 10a and 10b. Thus, rectifier 12 is operating near saturated level as desired and DC bus voltage $V_{dc}$ is minimized.

D. Other Embodiments

While the invention has been described above as one wherein signals $V_{qs}$ and $V_{ds}$ are used to identify amplitude signal $\hat{V}_a$, other intermediate signal sets can likewise be used. For example, because signals $V_{qs}$ and $V_{ds}$ are derived from signals $V_{qe}$ and $V_{de}$, signals $V_{qe}$ and $V_{de}$ could be used to identify amplitude signal $\hat{V}_b$. Similarly, because signals $V_{qs}$ and $V_{ds}$ are used to generate modulating signals $V_{m1}$, $V_{m2}$ and $V_{m3}$, modulating signals $V_{m1}$, $V_{m2}$ and $V_{m3}$ could be used to generate signal $\hat{V}_a$.

In addition, while value k could be set to a constant, value k may be variable so that an operator can control how close rectifier control comes to the saturation point. For example, by decreasing value k, an operator could ensure that the minimum level of DC bus level necessary to cove the utility supplied rectifier input voltage. In this manner, a hybrid type of control could be provided.

It should be understood that the methods and apparatuses described above are only exemplary and do not limit the scope of the invention, and that various modifications could be made by those skilled in the art that would fall under the scope of the invention. To apprise the public of the scope of this invention, we make the following claims:

We claim:

1. An apparatus for use with a motor controller, the controller including a PWM switch mode rectifier linked to a utility grid which provides three utility supplied rectifier input AC voltages at rectifier inputs, the rectifier also linked to a DC bus for generating DC voltage on the bus, the controller using rectifier input current feedback signals, DC bus voltage feedback signals and a DC command signal to generate a synchronous signal set including synchronous d and q-axis voltage signals, using the synchronous set to generate a stationary signal set including stationary d and q-axis voltage signals, using the stationary set to generate a modulating signal set including first, second and third modulating signals, providing a triangle carrier signal having a peak amplitude, comparing the modulating signals to the carrier signal to generate control signals for the rectifier to convert the utility supplied input voltages to DC voltage on the DC bus, each of the synchronous, stationary and modulating sets being an intermediate set, the apparatus for limiting the DC voltage to a minimum DC voltage required to generate rectifier input voltages which are greater than the utility supplied input voltages, the apparatus comprising:

- an amplitude signal generator receiving a first intermediate set's signals and generating an amplitude signal, the first intermediate set's signals defining a vector having a vector amplitude, the amplitude signal being a function of the vector amplitude;
- a reference signal generator which generates a reference signal as a function of the carrier signal peak amplitude;
- a first summer mathematically combining the reference signal and the amplitude signal generating an error signal;
- a regulator receiving the error signal and providing a correction signal as a function of the error signal; and
- a second summer mathematically combining the command signal and the correction signal generating a modified command signal representing the minimum DC bus voltage signal.

2. The apparatus of claim 1 wherein the first summer mathematically combines by subtracting the amplitude signal from the reference signal and the second summer mathematically combines by subtracting the correction signal from the command signal.

3. The apparatus of claim 2 wherein the first intermediate set is the stationary set and the amplitude signal generator generates the amplitude signal by squaring the stationary d-axis voltage signal to provide a first squared signal, squaring the stationary q-axis voltage signal to provide a second squared signal and adding the first and second squared signals.

4. The apparatus of claim 1 wherein the reference signal generator generates the reference signal by multiplying the peak amplitude by a constant k and squaring the product.

5. The apparatus of claim 4 wherein the value k can be modified.

6. The apparatus of claim 5 wherein the rectifier is controlled according to the sinusoidal PWM control method and k is 1.0.

7. The apparatus of claim 5 wherein the rectifier is controlled according to the space vector method and k is essentially 1.154.

8. The apparatus of claim 1 wherein the regulator is a proportional-integral controller.

9. The apparatus of claim 7 wherein, when the error signal is negative, the correction signal is zero and when the error signal is positive, the correction signal is linearly related to the error signal.

10. A method for use with a motor controller, the controller including a PWM switch mode rectifier linked to a utility grid which provides three utility supplied rectifier input AC voltages at rectifier inputs, the rectifier also linked to a DC bus for generating DC voltage on the bus, the controller using rectifier input current feedback signals, DC bus voltage feedback signals and a DC command signal to generate a synchronous signal set including synchronous d and q-axis voltage signals, using the synchronous set to generate a stationary signal set including stationary d and q-axis voltage signals, using the stationary set to generate a modulating signal set including first, second and third modulating signals, providing a triangle carrier signal having a peak amplitude, comparing the modulating signals to the carrier signal to generate control signals for the rectifier to convert the utility supplied input voltages to DC voltage on the DC bus, each of the synchronous, stationary and modulating sets being an intermediate set, the method for limiting the DC voltage to a minimum DC voltage required to generate rectifier input voltages which are greater than the utility supplied input voltages, the method comprising the steps of:

- receiving a first intermediate set's signals and generating an amplitude signal, the first intermediate set's signals defining a vector having a vector amplitude, the amplitude signal being a function of the vector amplitude;
- generating a reference signal as a function of the carrier signal peak amplitude;
- mathematically combining the reference signal and the amplitude signal generating an error signal;
- providing a correction signal as a function of the error signal; and
- mathematically combining the command signal and the correction signal generating a modified command signal representing the minimum DC bus voltage signal.

11. The method of claim 10 wherein the step of mathematically combining the reference signal and the amplitude signal include the step of subtracting the amplitude signal from the reference signal and the step of mathematically combining the command signal and the correction signal include the step of subtracting the correction signal from the command signal.

12. The method of claim 11 wherein the first intermediate set is the stationary set and the step of generating an amplitude signal includes the steps of squaring the stationary d-axis voltage signal to provide a first squared signal, squaring the stationary q-axis voltage signal to provide a second squared signal and adding the first and second squared signals.

13. The method of claim 10 wherein the step of generating the reference signal includes the step of multiplying the peak amplitude by a constant k and squaring the product.

14. The method of claim 13 wherein the value k can be modified.

15. The method of claim 14 wherein the rectifier is controlled according to the sinusoidal PWM control method and k is 1.0.

16. The method of claim 14 wherein the rectifier is controlled according to the space vector method and k is essentially 1.154.

17. The method of claim 10 wherein, when the error signal is negative, the correction signal is zero and when the error signal is positive, the correction signal is linearly related to the error signal.

* * * * *